United States Patent
Dodd

[11] Patent Number: 6,031,469
[45] Date of Patent: Feb. 29, 2000

[54] ERGONOMIC COMPUTER KEYBOARD

[76] Inventor: Jerry Dodd, P.O. Box 7072, Rancho Santa Fe, Calif. 92067

[21] Appl. No.: 08/748,146

[22] Filed: Nov. 12, 1996

[51] Int. Cl.[7] .................................................. H03M 11/00
[52] U.S. Cl. .......................... 341/22; 341/20; 345/168; 400/489
[58] Field of Search ................................. 340/22, 21, 20; 345/168; 400/489, 485

[56] References Cited

U.S. PATENT DOCUMENTS

| | | |
|---|---|---|
| Re. 33,422 | 11/1990 | Garcia . |
| 1,336,151 | 4/1920 | O'Connor . |
| 2,438,825 | 3/1948 | Roth ........................................ 250/41.5 |
| 3,017,463 | 1/1962 | Dinsmore .................................. 178/79 |
| 3,022,878 | 2/1962 | Seibel ....................................... 197/19 |
| 3,698,532 | 10/1972 | Dodds ....................................... 197/100 |
| 3,698,533 | 10/1972 | Illig et al. ................................. 197/100 |
| 3,847,263 | 11/1974 | X .............................................. 197/100 |
| 3,929,216 | 12/1975 | Einbinder .................................. 197/100 |
| 3,945,482 | 3/1976 | Einbinder .................................. 197/100 |
| 4,067,431 | 1/1978 | Whitaker .................................... 197/98 |
| 4,081,068 | 3/1978 | Zapp .......................................... 197/98 |
| 4,201,489 | 5/1980 | Zapp .......................................... 400/485 |
| 4,244,659 | 1/1981 | Malt .......................................... 400/486 |
| 4,332,493 | 6/1982 | Einbinder .................................. 400/484 |
| 4,360,892 | 11/1982 | Endfield ..................................... 364/900 |
| 4,414,537 | 11/1983 | Grimes ................................... 340/365 R |
| 4,467,321 | 8/1984 | Volnak ...................................... 340/365 |
| 4,641,026 | 2/1987 | Garcia ....................................... 250/229 |
| 4,655,621 | 4/1987 | Holden ...................................... 400/100 |
| 4,775,255 | 10/1988 | Langley ..................................... 400/485 |
| 4,913,573 | 4/1990 | Retter ........................................ 400/489 |
| 4,971,465 | 11/1990 | Hashimoto ................................ 400/485 |
| 5,017,030 | 5/1991 | Crews ....................................... 400/485 |
| 5,122,786 | 6/1992 | Rader ........................................ 340/711 |
| 5,166,669 | 11/1992 | Romberg ................................... 340/711 |
| 5,178,477 | 1/1993 | Gambaro ................................... 400/489 |
| 5,197,811 | 3/1993 | Levinrad ................................... 400/489 |
| 5,278,779 | 1/1994 | Conway ................................... D14/115 |
| 5,281,966 | 1/1994 | Walsh ........................................ 341/22 |
| 5,410,333 | 4/1995 | Conway ................................... 345/169 |
| 5,411,341 | 5/1995 | Ullman ...................................... 400/489 |
| 5,426,449 | 6/1995 | Danziger ................................... 345/168 |
| 5,432,510 | 7/1995 | Mathews ................................... 341/20 |
| 5,493,654 | 2/1996 | Gopher ...................................... 341/22 |

*Primary Examiner*—Michael Horabik
*Assistant Examiner*—Albert K. Wong

[57] ABSTRACT

An ergonomic, efficient unitary pyramidal-shaped data entry device includes left and right hand members separated from each other by a thumb control surface. Each hand member is formed with four cavities for receiving the four fingers of the left and right hands, respectively, of a user, with the user's thumbs being juxtaposed with the thumb control surface. Each cavity contains three switches, with one switch being operated when the user extends the appropriate finger, a second being operated when the user depresses the finger, and a third being operated when the user retracts the finger. Each switch generates a signal representative of a character of a character set, with thumb switches being operable by the user's thumbs to invoke one of a plurality of sets. The sets include a character set that mimics the conventional QWERTY layout, and also include sets which represent language-optimized layouts. The device can also assume the function of a telephone and a cursor control pad.

7 Claims, 6 Drawing Sheets

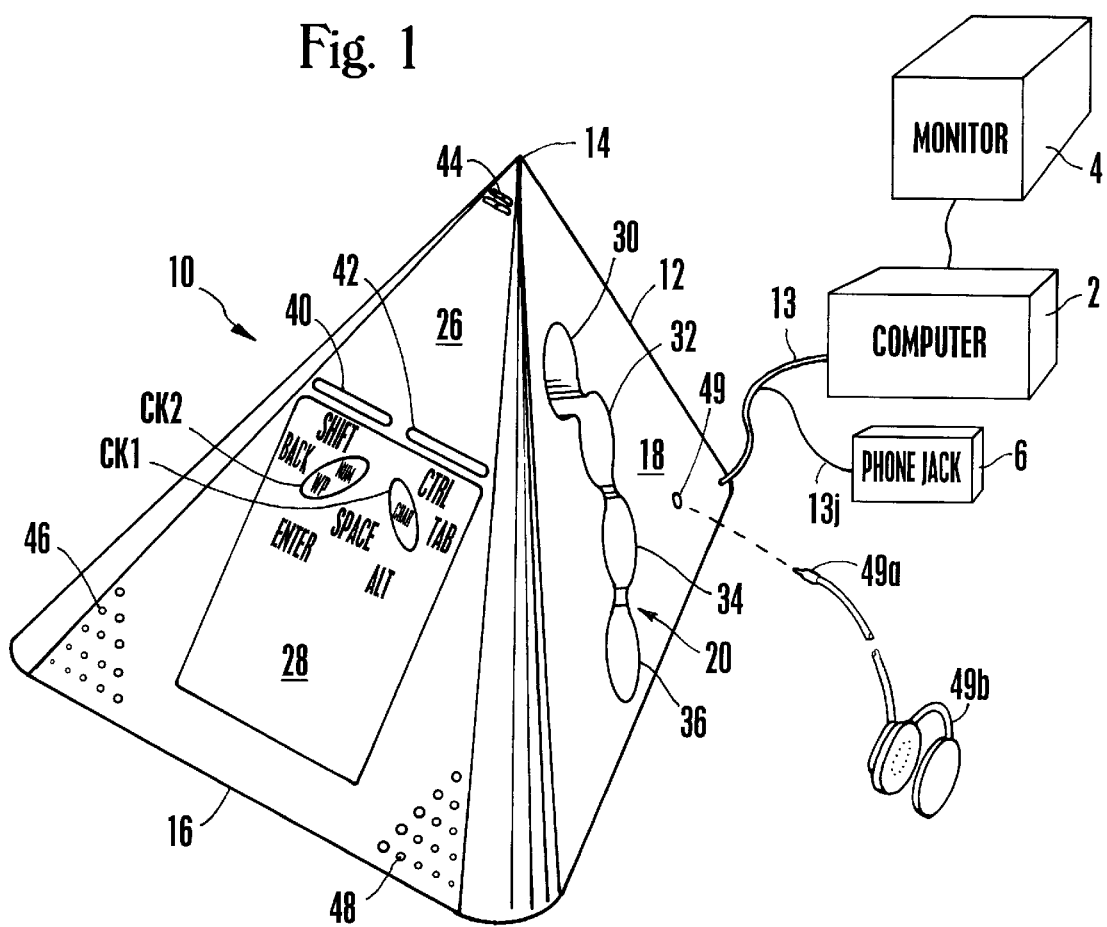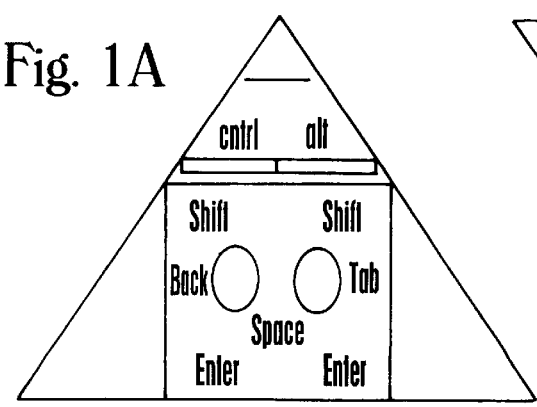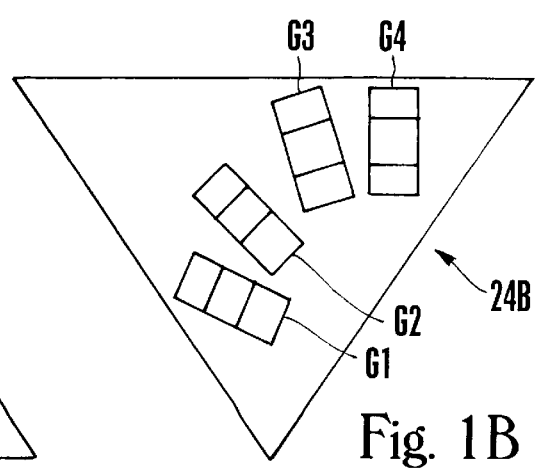

ERGONOMIC COMPUTER KEYBOARD

FIELD OF THE INVENTION

The present invention relates generally to computer input devices, and more particularly to devices such as keyboards and keypads for manual data input to computers.

BACKGROUND

Computers, along with computer data entry devices, have become ubiquitous in developed countries. While computer technology has advanced markedly in recent years, the most common data entry device—the keyboard—remains essentially unchanged from its original design, which dates back nearly a century. This original mechanical design, developed by Shoals for the Remington Small Arms Company, is commonly referred to as a "QWERTY" design, after the first six characters in the top row of letter keys. The QWERTY design was developed before ergonomic considerations became important. Consequently, the conventional QWERTY design causes repetitive stress injuries by requiring excessive pronation of the wrists and lateral movement of certain fingers between keys.

Further, the QWERTY key layout was not designed for optimal data input speed, but rather to ensure that typists did not overtax the moving assemblies in mechanical typewriters. Moreover, QWERTY keyboards consume a relatively large area, which presents a problem in small workplaces in which many other desktop devices might be located. Nevertheless, the cumbersome, unergonomic, inefficient design of standard QWERTY keyboards remains incorporated in most computer data entry systems.

Not surprisingly, alternative data entry "keyboards" have been developed, each attempting to address a select one of the above-noted deficiencies of the QWERTY keyboard. For example, U.S. Pat. No. 5,493,654 to Gopher et al. discloses a chordic keyboard system having a left hand keyboard and a right hand keyboard, with each keyboard including four finger keys on a first surface and four thumb keys on a second surface. The second surface is ergonomically angled relative to the first surface. Thus, the user of the Gopher et al. device is not required to move his or her fingers other than to operate a single key dedicated to the finger, thereby alleviating a source of repetitive stress injury. Unfortunately, however, the device of Gopher et al. requires separate left and right keyboards, each with an integral palm rest, which is somewhat space-inefficient. Also, as mentioned above the Gopher et al. device requires the user to learn a chorded system, in which plural keys must be activated simultaneously to input a single character. It is relatively cumbersome to memorize and then execute these multiple-key character inputs.

U.S. Pat. No. 4,913,573 to Retter discloses a keyboard having left and right handpads, with each handpad having four wells for respectively receiving a user's fingers therein. In most wells, five switches are provided, so that each finger can input five characters in a non-chorded (i.e., single keystroke) system. Unfortunately, side wall switches in each well require awkward lateral finger motion to operate. Further, the Retter device mimics the inefficient QWERTY key layout, and, like the above-mentioned Gopher et al. device, it requires two separate units with handpads. Consequently, it also consumes excessive desk top space.

In addition to the above-mentioned devices which seek to improve the ergonomics of data entry keyboards, devices such as the one disclosed in U.S. Pat. No. 4,332,493 to Einbinder propose a keyboard character layout that improves character input efficiency (i.e., typing speed), without necessarily addressing the ergonomic or space concerns discussed above. For example, as recognized by Einbinder, certain digraphs (two successive letters) appear relatively frequently in English text, and the keyboard can be improved by locating the letters of the alphabet on the keyboard such that high frequency digraphs can be input more efficiently. Unfortunately, none of the QWERTY alternatives, including Einbinder, have proven sufficiently better to induce users to change from the familiar QWERTY layout.

Still further, none of the above-mentioned devices recognize the desirability of further increasing user efficiency by incorporating a telephone in the keyboard itself, such that the user can operate a telephone without requiring the use of a separate telephone keypad, and without requiring the associated computer to process the call. As recognized by the present invention, however, it is possible to provide a data entry keyboard which is compact, ergonomic, efficient, and which incorporates a telephone in the device itself, so that a user need not release a data entry keyboard to use a telephone.

Accordingly, it is an object of the present invention to provide a data entry device which is compact. Another object of the present invention is to provide a data entry device which is ergonomic. Still another object of the present invention is to provide a data entry device which incorporates efficient character layouts in plural languages and a separate English layout that mimics the QWERTY design. Yet another object of the present invention is to provide a data entry device which includes a telephone. Another object of the present invention is to provide a data entry device which includes finger wells or cavities having plural switches that are operable by finger pressure, and which does not require lateral finger motion to operate a switch. Moreover, it is an object of the present invention to provide a data entry device which is easy to use and cost effective to manufacture.

SUMMARY OF THE INVENTION

An ergonomic data entry device is disclosed which includes a unitary housing defining a right hand member, a left hand member, and a thumb control surface extending between and opposed to the hand members. Each hand member is formed with four finger input groups. Preferably, each finger group is established by a respective cavity, with each cavity being configured for receiving a respective finger of a user's hand. Three pressure sensitive switches are disposed in each cavity, and each switch is separately operable by the user to generate a respective finger signal. A microprocessor receives the finger signals from the switches and generates respective character signals that represent respective keyboard characters in response thereto.

In a preferred embodiment, the thumb control surface can be a keypad or touchpad which includes a plurality of control keys, and each key can generate a respective control signal when the user urges against the key. Preferably, at least one of the control signals is a set signal that selects one of a plurality of character sets, and the microprocessor generates each character signal in response to the set signal and the respective finger signal. The preferred data entry device incorporates a character layout in which at least one of the character sets represents letters, and all lower case vowels in a layout can be input by actuating a single switch on one of the hand members. If desired, one of the character sets mimics a QWERTY layout.

Desirably, a telephone microphone is mounted on the housing, and one of the control signals causes the thumb control pad to assume the function of a telephone keypad. Moreover, at least one of the control signals causes the thumb control pad to assume the function of a pressure-sensitive cursor control pad.

As disclosed in detail below, the housing defines an apex and a base opposed to the apex, and the switches in each cavity are respective first, second, and third switches that respectively generate first, second, and third finger signals. In one embodiment, the first, second, and third switches are respectively activated by a user's finger extending, contracting, and depressing within the cavity when the apex is oriented above the base and the user faces the thumb control surface. In another embodiment, the first, second, and third switches are activated by the user's finger depressing along three respective axes in the cavity. In the preferred character set the depression signals of the left hand member represent letters having a frequency of occurrence in English words greater than the frequency of occurrence of letters represented by extension and contraction signals from the left hand member.

Advantageously, the cavities of each hand member are arranged in an arc extending between the apex and the base, with the uppermost cavity establishing an index finger cavity. The next uppermost cavity establishes a middle finger cavity, and the next lowermost cavity establishes a ring finger cavity. Furthermore, the lowermost cavity establishes a pinky cavity. As intended by the present invention, the cavities respectively receive the user's index, middle, ring, and pinky fingers, such that the user's hand is in an ergonomically neutral orientation.

In another aspect, an efficient data entry device is disclosed that has an improved character layout. The data entry device includes a first hand member including twelve switches for generating respective first signals. Five of the first signals are representative of all the English language vowels. A second hand member is opposed to the first hand member, and the second hand member includes twelve switches for generating respective second signals.

In still another aspect, an ergonomic, efficient data entry device includes a housing defining right and left hand members generally opposed to each other. The device also includes a thumb control surface that extends between the hand members. As envisioned herein, the thumb control surface includes at least one control key for generating a character set signal representative of one of plural character sets. Twelve finger signal generating elements are provided on each hand member, and the twelve finger signal generating elements are arranged in four cavities on each member for generating first, second, and third signals in response to the extension, contraction, and depression of respective human fingers when the fingers are positioned in respective cavities. Additionally, means are provided for generating a character signal representative of an alpha-numeric character in response to the set signal and a respective first, second, and third signal.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a perspective view of the data entry device of the present invention as would be seen facing the device looking over the right shoulder of a user when the user is in the intended operating position vis-a-vis the device, schematically showing an associated computer, monitor, and telephone receptacle;

FIG. 1A is a schematic view of an alternate embodiment of the thumb control surface;

FIG. 1B is a schematic view of an alternate embodiment of a left hand member having three surface mounted keys per finger;

DETAILED DESCRIPTION OF THE PREFERRED EMBODIMENT

Figure 2:
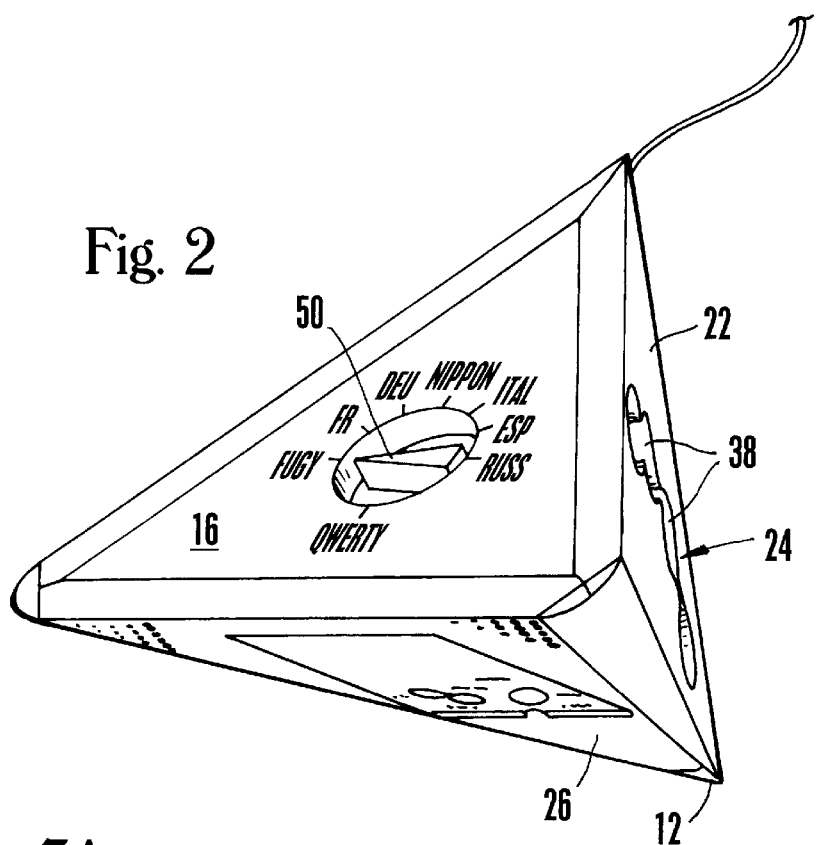
FIG. 2 is an isometric view of the data entry device from below and to the left of a user when the user is in the intended operating position vis-a-vis the device.

Referring initially to FIGS. 1 and 2, a data input device is shown, generally designated 10, that includes a unitary hollow plastic pyramidal-shaped housing 12. Although the housing 12 is unitary, it is to be understood that the faces of the housing 12 need not be integrally molded, but can be molded separately from each other and then connected to each other during manufacturing to establish the unitary structure shown. FIG. 1 shows that the device 10 communicates, via single wire bundle 13, with a computer 2 having an associated monitor or display 4 for entry of data into the computer 2. Also, for purposes disclosed below the device 10 communicates with a telephone jack 6 via a wire 13j that is part of the wire bundle 13.

In the particular embodiment shown, the housing 12 defines an apex 14 and a triangular or rectangular base 16. Preferably, the base 16 is triangular, and the edges of the base are about six to ten inches (6"–10") long. Accordingly, in the preferred embodiment the housing 12 defines three triangular faces that rise from the base 16 to the apex 14. When the housing is generally oriented as shown, i.e., with the apex 14 above the base 16 and the base 16 resting on a surface, the housing defines a right face 18 that establishes a right hand member, generally designated 20. Also, the housing defines a left face 22 (best shown in FIG. 2) that establishes a left hand member, generally designated 24. As can be appreciated in cross-reference to FIGS. 1 and 2, the left hand member 24 is generally opposed to the right hand member 20. Further, the housing 12 defines a middle face 26 that supports a thumb control surface 28, with the thumb control surface 28 extending between the hand members 20, 24 as shown.

FIGS. 1 and 2 show that each hand member 20, 24 is formed with four key groups, preferably four thimble-like cavities that are configured and arranged for receiving the fingers of a user's hand. Specifically, taking the right hand member 20 as an example, four right hand cavities 30, 32, 34, 36 are formed therein and are arranged in a somewhat concave arc (relative to the middle face 26) that extends between the apex 14 and the base 16. The cavities may be interconnected if desired, as shown.

In accordance with the present invention, the uppermost cavity 30 establishes an index finger cavity. Moreover, the next uppermost cavity 32 establishes a middle finger cavity, and the next lowermost cavity 34 establishes a ring finger cavity. The lowermost cavity 36 establishes a pinky cavity, and the cavities 30, 32, 34, 36 respectively receive the user's index, middle, ring, and pinky fingers of the right hand, such that the user's hand is in an ergonomically neutral orientation when the device 10 is generally oriented as shown and the user faces the middle face 26. In other words, the cavity arrangement disclosed above mirrors the natural arc of the finger tips of a partially closed right hand. It is to be understood that four cavities 38 are formed in the left hand member 24 (FIG. 2), and that the cavities 38 in the left hand member 24 mirror those of the right hand member 20, i.e., the cavities 38 of the left hand member are arranged in an arc to mirror the natural arc of the finger tips of a partially closed left hand. Alternatively, referring briefly to FIG. 1B, a left hand member 24B can have four finger groups G1, G2, G3, G4, with each finger group including three surface mounted keys per finger that lie on an arc radiating from the front edge of the surface of the hand member 24B.

Referring back to FIGS. 1 and 2, it can readily be appreciated that when the user's fingers are positioned in the cavities 30–38 of the right and left hand members 20, 24 as described above, the user's thumbs will be naturally oriented over the thumb control surface 28. As shown best in FIG. 1, the middle face 26 supports left and right manually depressible control bars 40, 42 for respective operation thereof by the left and right thumbs. The control bars 40, 42 may be thought of as part of the thumb control surface 28. As discussed more fully below, operation of the control bars 40, 42 generates control signals that can cause the thumb control surface 28 to display word processing function keys as shown, or a telephone keypad, or a cursor control screen. In the preferred embodiment, the thumb control surface 28 is a touch sensitive flat panel display, e.g., a touch sensitive liquid crystal display (LCD), and the active locations of flat panel display can be thought of as "keys". Alternatively, the thumb control surface 28 can be a keypad.

In the preferred embodiment shown in FIG. 1, the thumb control surface 28, when configured in the word processing function shown, displays, in the upper left corner of the surface 28, the word "SHIFT". In accordance with touch screen principles well-known in the art, the word "SHIFT" represents a "SHIFT" key that can be depressed by a user, and that corresponds in meaning to the shift key of a conventional keyboard. Indeed, as intended by the present invention the meanings of the keys discussed below are the same as the meanings of the corresponding keys of a conventional keyboard. The "SHIFT" key can be conveniently depressed by the user's left thumb.

Also, in the word processing function the thumb control surface 28 displays a "CTRL" key in the upper right corner of the thumb control surface 28. If desired, the "CTRL" key be replaced with a second "SHIFT" key, as shown in FIG. 1A. Referring back to FIG. 1, below the "SHIFT" key and "CTRL" key, the thumb control surface 28 displays a row of keys including, from right to left, a "TAB" key, a "CHAR" key CK1, "WP/NUM" key CK2, and a backspace key labelled "BACK" in FIG. 1. In accordance with the present invention, the "WP/NUM" key CK1 and "CHAR" key CK2 are keys that are unique to the device 10, and they generate control signals when depressed that are set signals in that they toggle between character sets as disclosed further below. Along with the control bars 40, 42, the "WP/NUM" key CK1 and "CHAR" key CK2 can be thought of as control keys.

Centered on the thumb control surface 28 below the "CHAR" key CK1 and "WP/NUM" key CK2 is a "SPACE" key representing a conventional space bar. Below and to the right of the "SPACE" key is an "ALT" key, whereas below and to the left of the "SPACE" key is an "ENTER" key. If desired, the "ALT" key can be replaced by a second "ENTER" key, as shown in FIG. 1A. Referring back to FIG. 1, the keys on the right side of the thumb control surface 28 are conveniently depressed by the right thumb, and the keys on the left side of the thumb control surface 28 are conveniently depressed by the left thumb. The "SPACE" key, on the other hand, can be conveniently depressed by either thumb. If desired, the thumb control surface 28 can also display the layout of the keys of the left and right hand members 24, 20 that are discussed more fully below. In other words, the thumb control surface 28 essentially can display one of FIGS. 6–11 for the user's convenience.

In addition to the structure above, the middle face 26 of the housing 12 is formed with a telephone microphone grille 44 near the apex 14. Further, the middle face 26 is formed with left and right telephone speaker grilles 46, 48 near the base 16, for purposes to be shortly disclosed. Also, a telephone headset jack 49 is attached to the housing 12 as shown, so that a user can engage the jack 49 with a connector 49A of a telephone headset 49B and thereby disable the speakers behind the speaker grilles 46, 48 and instead use the telephone headset in accordance with well-known principles.

With particular regard to FIG. 2, the base 16 of the housing 12 includes a selector switch 50. The selector switch 50 is rotatably mounted on the housing 12 and can be manipulated to indicate one of a plurality of desired key layouts, including a conventional QWERTY layout, the novel English-language "FUGY" layout of the present invention described below, and various keyboard layouts for foreign languages that have been optimized to use the principles of the FUGY layout disclosed below for English language text.

Figure 3A:
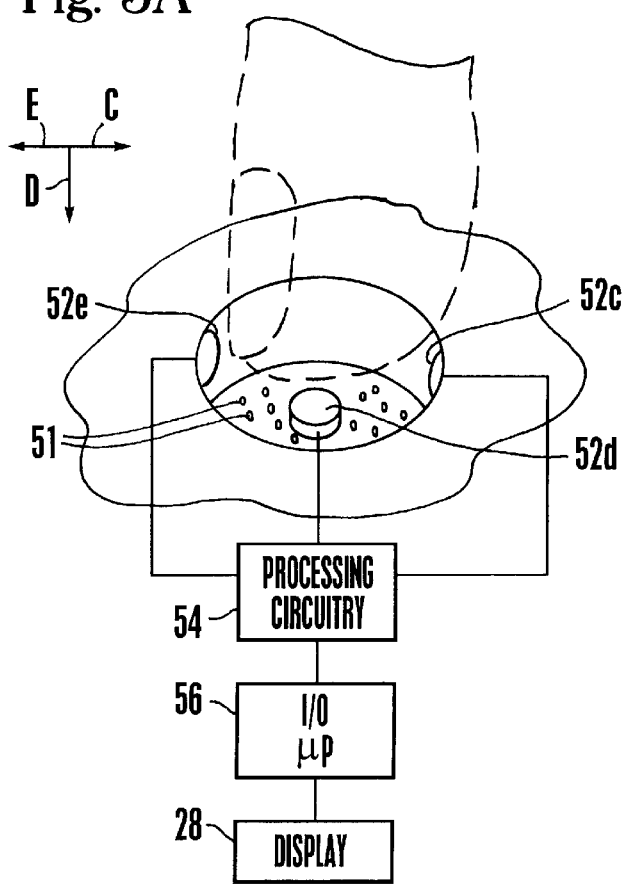
FIG. 3A is a perspective cut-away view of one of the finger cavities of the present invention, schematically showing the signal processing circuitry, with a user's index finger shown in phantom.

In cross-reference now to FIGS. 1 and 3A, as envisioned by the present invention each of the eight cavities 30–38 contains three pressure sensitive switches, and FIG. 3A shows, as an example, the uppermost cavity 30 of the right hand member 20. It is to be understood that the remaining cavities 32–38 include switches that are configured in accordance with the principles discussed herein with respect to the uppermost cavity 30. Preferably, the cavity 30 is configured with walls that taper slightly inwardly from the right face 18 toward a concave bottom, to thereby match the contour of a finger. The cavity 30 advantageously is formed with perforations 51 for venting skin perspiration out of the cavity 30.

As shown in FIG. 3A, the cavity 30 includes extension, contraction, and depression switches 52e, 52c, 52d, with the switches being recessed in the cavity 30. Thus, no components extend beyond the faces 18, 22 of the housing 12. The switches 52e, 52c, 52d can be established by separate switch structures as shown, or by a single three-position switch. When the switches 52e, 52c, 52d are separate structures, they are spring-loaded in accordance with principles well-known in the art.

The spring tension of the switches in the lowermost pinky cavity 36 (FIG. 1), however, is less than the spring tension of the switches in the other cavities 30–34, owing to the relative weakness of users' pinky fingers. Also, slightly greater spring pressure is applied to the contraction and depression switches 52c, 52d than to the extension switch 52e.

Recall that the cavity 30 receives the user's right index finger (shown in phantom in FIG. 3A) in the orientation shown in FIG. 3A when the device 10 is oriented vis-a-vis the user as intended. Accordingly, it can be appreciated that the extension, contraction, and depression switches 52e, 52c, 52d are so named because they are respectively depressed by the index finger when the index finger extends (as indicated by arrow "E" in FIG. 3A), contracts (as indicated by arrow "C" in FIG. 3A), and is depressed (as indicated by arrow "D" in FIG. 3A) toward the bottom of the cavity 30. Likewise, the switches in the other cavities 32–38 are operated by extension, contraction, or depression of the associated fingers. In other words, only three switches are provided per cavity, and all of a cavity's switches lie in a common plane that is perpendicular to the respective housing 12 face, such that every switch can be operated by one of the three above-mentioned ergonomically easy motions. Thus, advantageously none of the present switches require finger reaching movement or lateral movement of any fingers to operate.

The switches 52e, 52c, 52d can be any suitable switches that are separately operable from each other to generate electrical signals, referred to herein as "finger" signals, when depressed by a user. As intended by the present invention, the extension, contraction, and depression switches 52e, 52c, 52d respectively generate extension, contraction, and depression finger signals.

These finger signals are sent to switch signal processing circuitry 54 in the housing 12 for processing in accordance with principles well-known in the art, and then to an input/output (I/O) microprocessor 56 that is mounted in the housing 12. The I/O microprocessor 56 generates respective character signals representative of respective keyboard characters in response to the finger signals from the right and left hand members 18, 22 and control signals from the thumb control surface 28. As shown in FIG. 3A, the I/O microprocessor 56 is connected to the thumb control surface 28 to cause the surface 28 to display the characters represented by the finger signals, if desired. Alternatively, the I/O microprocessor 56 can interface with the operating system of the computer 2 to cause a window of the monitor 4 to display the characters and/or present the keyboard layout of the device 10.

Figure 3B:
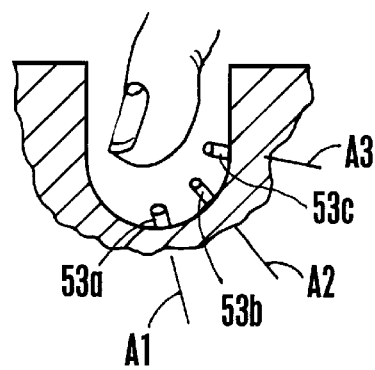
FIG. 3B is a perspective cut-away view of an alternate embodiment of a finger cavity of the present invention.

FIG. 3B shows that alternatively, three switches 53a–53c can be positioned in a cavity relatively close together, such that a user's finger can selectively operate three switches without an extension movement, and more particularly by a depression movement. Or, in yet another embodiment the three switches 53 need not be disposed in a cavity, but can be disposed on the surface of each hand member. In any case, the three switches of the present invention can be activated by a user's non-lateral finger movement along three respective axes A1, A2, A3 within the cavity.

Figure 4:
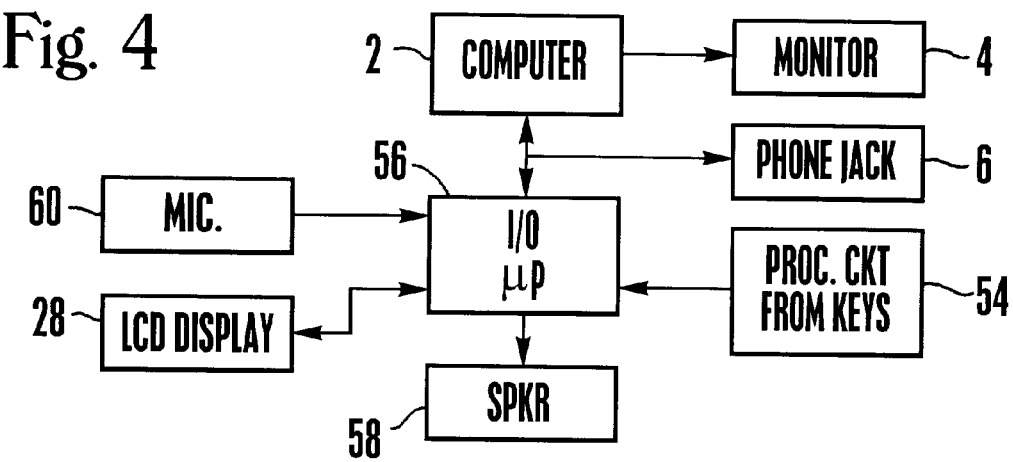
FIG. 4 is a block diagram of the electrical components of the device.

FIG. 4 shows the electrical components of the present invention. As disclosed above, the I/O microprocessor 56 is connected to the thumb control surface (LCD display) 28 for receiving control signals therefrom and for presenting alphanumeric data thereon. Also, the I/O microprocessor 56 is electrically connected to the signal processing circuits 54 from the hand members 20, 24, for receiving the finger signals therefrom. Moreover, as disclosed above the I/O microprocessor 56 is connected to the computer 2.

Additionally, as mentioned above the device 10 can assume a telephone function. Accordingly, the I/O microprocessor 56 is connected to the telephone jack 6, and to one or more telephone speakers 58 and a telephone microphone 60 that are respectively located behind the speaker grilles 46, 48 and microphone grille 44 (FIG. 1). Thus, it is to be understood that the microprocessor 56 includes telephone circuitry, and that the device 10 can function as a telephone independently of the computer 2.

Figure 5:
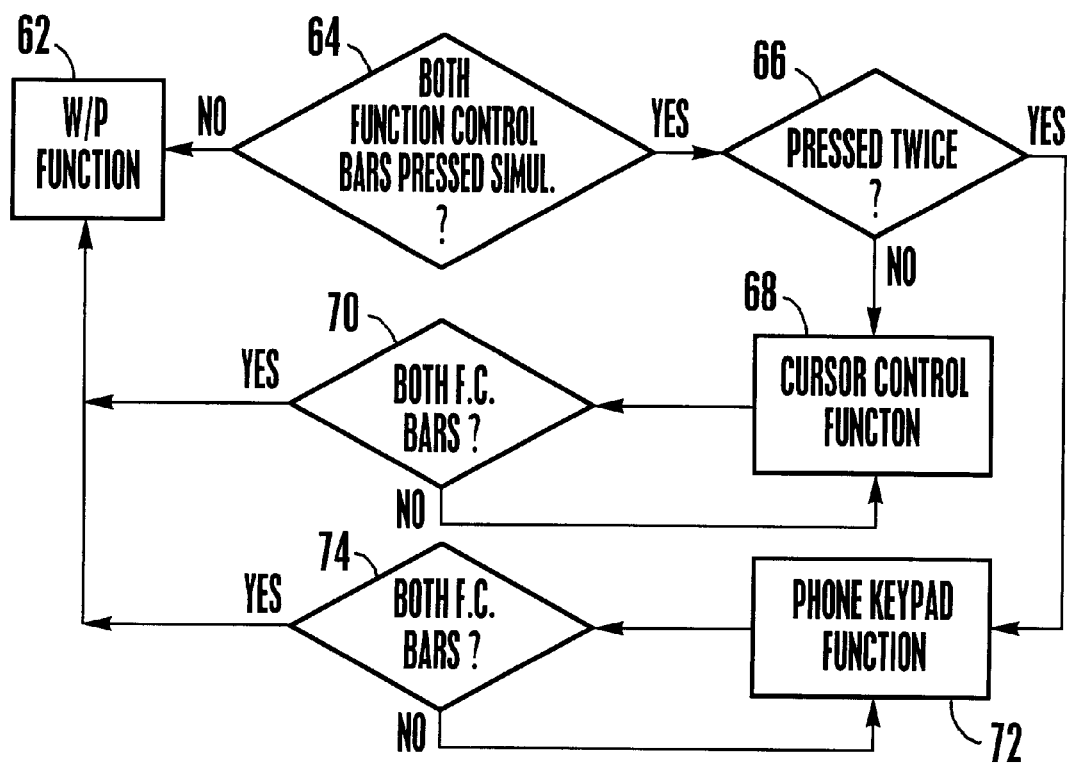
FIG. 5 is a flow chart showing the logic in selecting the function of the thumb control surface.

Indeed, referring now to FIG. 5, the method by which a user of the device 10 can select among a word processing function, a telephone function, and a cursor control function can be seen. The device 10 defaults to a word processing function at block 62. In the word processing function, the thumb control surface 28 assumes the configuration and operation disclosed above.

To configure the device 10 for other functions, however, the user can simultaneously depress the thumb control bars 40, 42. Accordingly, at decision diamond 64 the I/O microprocessor 56 determines whether both control bars 40, 42 have been simultaneously depressed. If so, the logic proceeds to decision diamond 66, wherein it is determined whether the control bars 40, 42 have been simultaneously depressed twice in rapid succession. If not, the user has signalled a desire to configure the device 10 as a cursor control element, and the logic accordingly proceeds to block 68, wherein the device 10 assumes a cursor control function.

In the cursor control function, the thumb control surface 28 displays no keys. Rather, it is blank, and the user can move his fingers across the surface to generate pressure signals. The pressure signals are sent to the computer 2 to cause a cursor on the monitor 4 to move in accordance with principles well-known in the art. Also, in the cursor control function the control bars 40, 42 assume the functions of left and right toggles of a computer mouse.

When the user desires to once again use the device 10 as a word processing device, the user simultaneously depresses both control bars 40, 42. Accordingly, at decision diamond 70 the I/O microprocessor 56 determines whether both control bars 40, 42 have been simultaneously depressed. If so, the logic loops back to block 62, but otherwise remains in the cursor control function at block 68.

If, on the other hand, it is determined at decision diamond 66 that the control bars 40, 42 have been simultaneously depressed twice in rapid succession, the logic moves to block 72, wherein the device 10 assumes a telephone keypad function. In the keypad function, the thumb control surface 28 presents a conventional telephone keypad layout, so that a user can manipulate the control surface 28 to make telephone calls in cooperation with the speakers 58/microphone 60 (FIG. 4) or telephone headset that is plugged into the jack 49 (FIG. 1). It is also possible to present additional telephone functions on the touch sensitive display surface 28 that are unique to a given PBX telephone system, e.g., hold, call forward, etc.

When the user desires to once again use the device 10 as a word processing device, the user simultaneously depressed both control bars 40, 42. Accordingly, at decision diamond 74 the I/O microprocessor 56 determines whether both control bars 40, 42 have been simultaneously depressed. If so, the logic loops back to block 62, but otherwise remains in the telephone keypad function at block 72. Importantly, the user can remain on the telephone after configuring the device 10 in the word processing function, and can use the device 10 as a telephone without interacting with the computer 2.

Figure 6:
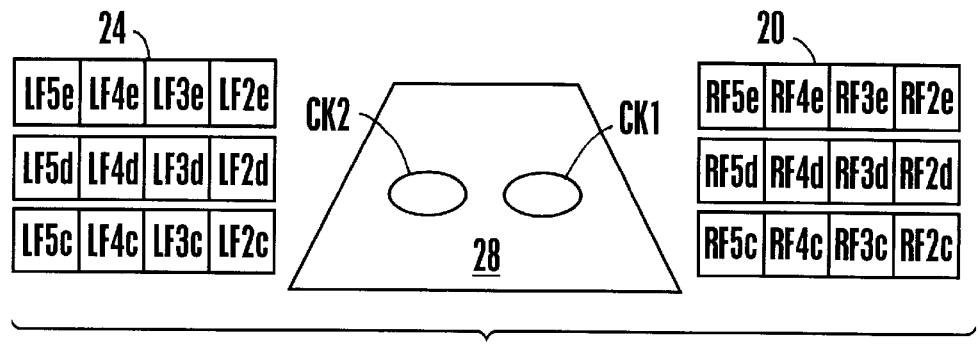
FIG. 6 is a schematic diagram of the hand members and thumb control surface of the preferred embodiment of the data entry device.

FIG. 6 schematically shows the left and right hand members 24, 20 and the control surface 28 with control keys CK1 and CK2, disclosing an illustrative mapping that is utilized below in reference to FIGS. 7–12 to refer to the meanings that the I/O microprocessor 56 will ascribe, in various keyboard layouts, to the finger signals of the twenty four (24) keys of the hand members 24, 20 of the present invention. More particularly, the top row for the left hand member 24 corresponds, in order from left to right, to the extension switches in the pinky finger, ring finger, middle finger, and index finger cavities 38 of the left hand member 24. In FIG. 6, the extension switches in the left hand member 24 are labelled "LF5e", "LF4e", "LF3e" and "LF2e".

In contrast, the middle row for the left hand member 24 corresponds to the depression switches, in order, in the pinky finger, ring finger, middle finger, and index finger cavities 38 of the left hand member 24. In FIG. 6, the depression switches in the left hand member 24 are labelled "LF5d", "LF4d", "LF3d" and "LF2d". Further, the bottom row for the left hand member 24 corresponds to the contraction switches, in order, in the pinky finger, ring finger, middle finger, and index finger cavities 38 of the left hand member 24. In FIG. 6, the contraction switches in the left hand member 24 are labelled "LF5c", "LF4c", "LF3c" and "LF2c".

Similarly, the top row for the right hand member 20 corresponds, in order from right to left, to the extension switches in the pinky finger, ring finger, middle finger, and index finger cavities 36, 34, 32, 30 of the right hand member 20. In FIG. 6, the extension switches in the right hand member 20 are labelled "RF5e", "RF4e", "RF3e and "RF2e".

In contrast, the middle row for the right hand member 20 corresponds to the depression switches, in order, in the pinky finger, ring finger, middle finger, and index finger cavities 36, 34, 32, 30 of the right hand member 20. In FIG. 6, the depression switches in the right hand member 20 are labelled "RF5d", "RF4d", "RF3d" and "RF2d". Further, the bottom row for the right hand member 20 corresponds to the contraction switches, in order, in the pinky finger, ring finger, middle finger, and index finger cavities 36, 34, 32, 30 of the right hand member 20. In FIG. 6, the contraction switches in the right hand member 20 are labelled "RF5c", "RF4c", "RF3c" and "RF2c".

Figure 7:
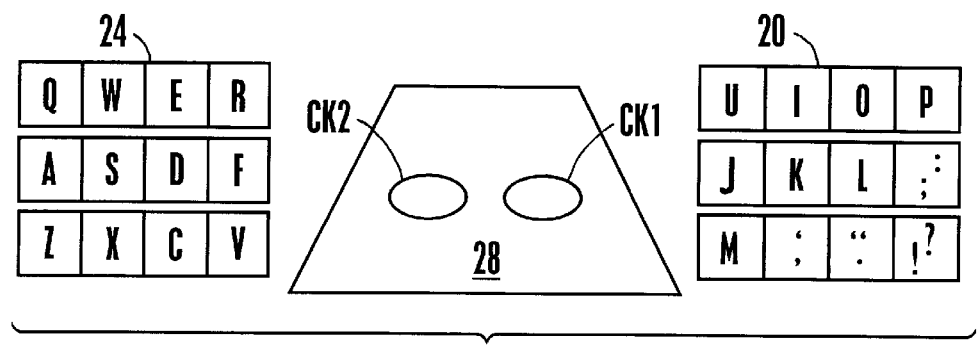
FIG. 7 is a schematic diagram showing the primary set of the QWERTY character layout of the present invention.

Now referring to FIG. 7, when the selector switch 50 (FIG. 2) is in the "QWERTY" position and neither control key CK1, CK2 has been depressed, the I/O microprocessor 56 correlates finger signals from the keys of the hand members 20, 24 (using the mapping of FIG. 6) to the primary QWERTY character set shown. In FIG. 7, the letter characters are shown in capitals, indicating that the "SHIFT" key (FIG. 1) on the thumb control surface has been depressed.

Figure 8:
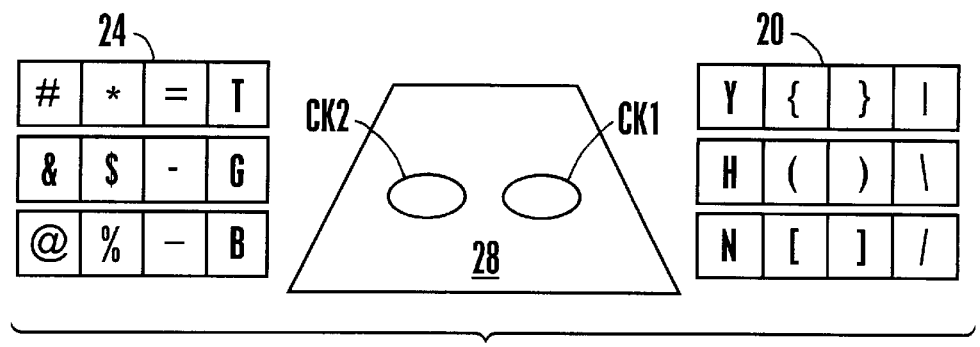
FIG. 8 is a schematic diagram showing the secondary set of the QWERTY character layout of the present invention.
Figure 9:
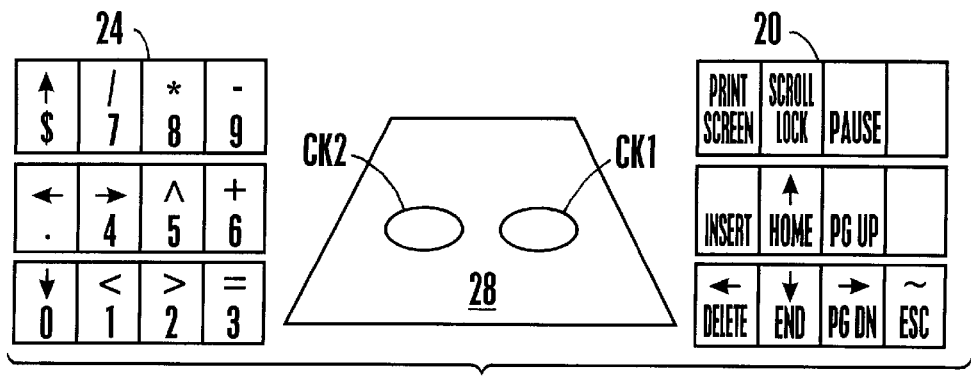
FIG. 9 is a schematic diagram showing the tertiary (numeric and word processing) set of the QWERTY character layout of the present invention.

To select the secondary QWERTY character set shown in FIG. 8, the user depresses the "CHAR" control key CK1. To revert to the primary set shown in FIG. 7, the user again toggles the "CHAR" control key CK1. On the other hand, to select the tertiary QWERTY character set (i.e., with numeric characters and word processing characters) shown in FIG. 9, the user depresses the "NUM/WP" control key CK2. To revert to the primary set shown in FIG. 7, the user again toggles the "NUM/WP" control key CK2. Simultaneously depressing both control switches CK1, CK2 causes the keys of the hand members 20, 24 to assume function key status, i.e., to assume the functions of the "F1" et seq. keys of a conventional keyboard. The CK1 and CK2 keys can be "locked" into a depressed position much like the capital letters lock of a conventional keyboard by pressing either of the control keys CK1, or CK2 twice in succession. One then toggles back to the primary set by again pressing the control keys CK1, CK2 twice in succession. To generate a finger signal representative of the conventional "ESCAPE" command, the switch RFd5 is held down for three seconds.

With the above disclosure in mind, it may now be appreciated that the present QWERTY layout mimics the layout of a conventional QWERTY keyboard, in that the letters that are assigned to particular fingers for touch typing on conventional QWERTY keyboards are assigned to the same fingers by the device 10. For example, the reach letters "T", "G", and "B" are stroked by the left index finger of a touch typist on a conventional QWERTY keyboard, and as shown in FIG. 8, these same letters are assigned to the keys of the left index finger when in the secondary QWERTY set. Advantageously, however, the sometimes awkward finger reaches that are otherwise required of typists to input these characters on conventional QWERTY keyboards are eliminated by the device 10. It can be further appreciated in reference to FIG. 7 that essentially, a home (middle) row of the left hand member 24 defines the letters "A", "S", "D", and "F", and reach keys (right column keys) in the secondary character set shown in FIG. 8 define the letters "T", "G", and "B", respectively.

Figure 10:
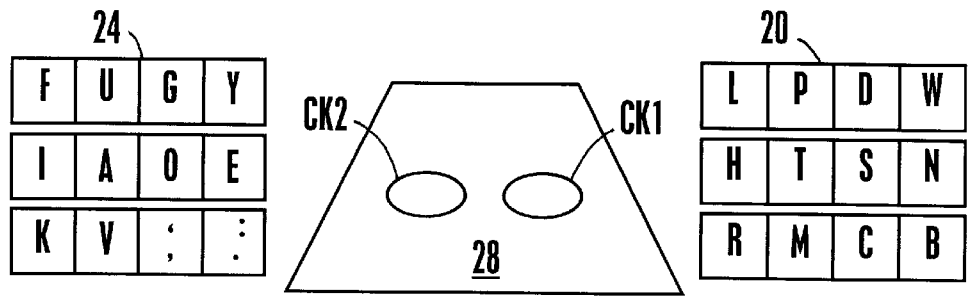
FIG. 10 is a schematic diagram showing the primary set of the FUGY character layout of the present invention.
Figure 11:
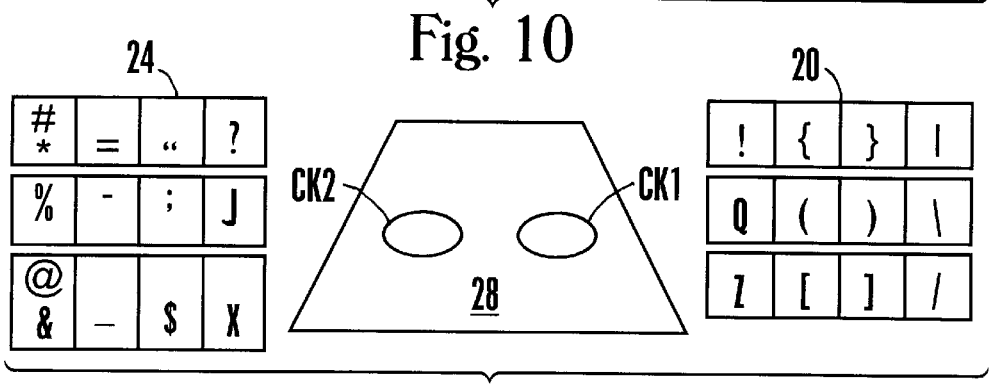
FIG. 11 is a schematic diagram showing the secondary set of the FUGY character layout of the present invention.
Figure 12:
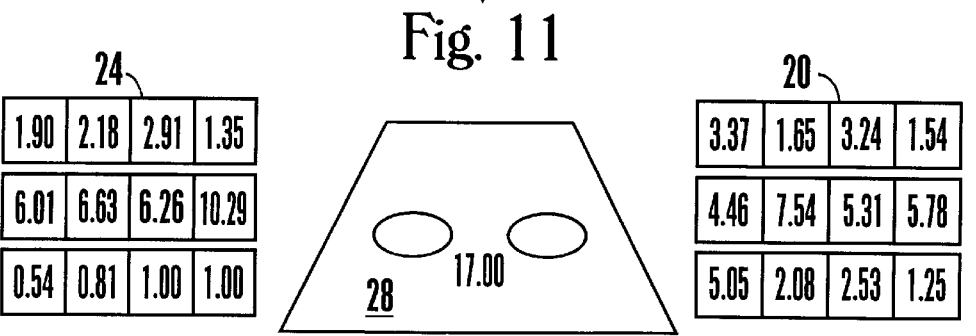
FIG. 12 is a schematic diagram showing, in percentage, the frequency of appearance in English text of the various characters in the primary FUGY character set.

Turning now to FIGS. 10–12, an improved keyboard layout for the English language, referred to herein as a "FUGY" layout after the first four characters in the top row of the left hand member 24, is shown. This layout is selected by the operator from among the layouts presented by the selector switch 50 on the bottom of the base 16. It is to be understood that the principles discussed below for rendering the "FUGY" layout can be used to render efficient keyboard layouts in languages other than English.

As shown in FIG. 10, in the primary character set of the FUGY layout, all of the vowels ("A", "E", "I", "O", and "U") are represented by finger signals from the switches on one of the left hand member 24. In contrast, the switches in the right hand member 20 generate finger signals representative only of consonants. As recognized by the present, this scheme promotes typing successive characters in typical English text with alternate hands, thereby increasing typing speed and, thus, efficiency.

FIG. 11 shows the secondary FUGY character set that is invoked by stroking the control key CK1 as described above in relation to the QWERTY layout.

Moreover, as indicated in cross-reference to FIGS. 10 and 12, the most-used (i.e., high frequency) vowels "A", "E", "I", and "O" are each assigned to the depression stroke of the left hand fingers, and each high frequency vowel is assigned to a different finger. Indeed, the FUGY layout shown in FIGS. 10–12 significantly reduces one-handed digraphs vis-a-vis the conventional QWERTY layout and virtually eliminates one-finger inputs of English digraphs that occur with a frequency of greater than 200 times per 100,000 letters and spaces in English text. Likewise, four of the five of the four highest frequency consonants are assigned to the depression stroke of the right hand fingers.

Counting the space character that is input by the thumbs, the characters contained in the above-disclosed primary FUGY character set have a combined rate of incidence of occurrence in English text of over 99.5%, as compared to only about 79% for the QWERTY layout. Further, the letters input by the home or center keys of the FUGY layout have an incidence rate of 52%, compared to a combined 21% for the home keys of a conventional QWERTY keyboard. Additionally, the herein-disclosed FUGY layout slightly favors the right hand, which is, on average, slightly more dexterous than the left. In contrast, conventional QWERTY keyboards slightly favor the left hand. Moreover, the FUGY layout of the present invention assigns letters, in order of frequency from high to low, to the index, middle, ring, and pinky fingers. The present FUGY layout distributes overall finger workload much more effectively than the conventional QWERTY layout. This is because finger usage frequency of the FUGY layout more closely mirrors the relative dexterity of a finger, while QWERTY mirrors relative finger strengths. As recognized by the present invention, dexterity is a much more important a consideration with electronic keyboards.

Figure 13:
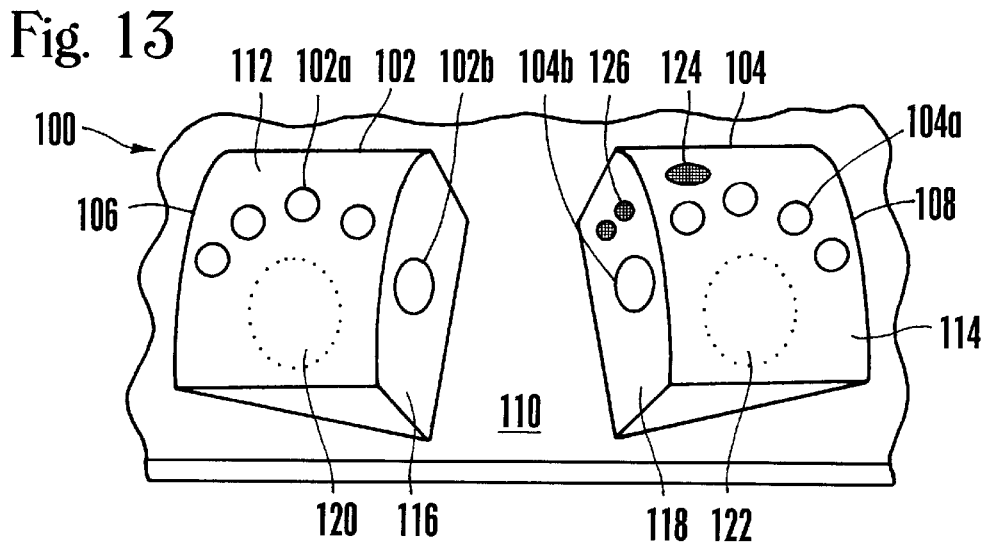
FIG. 13 is a perspective view of an alternate non-unitary embodiment of the present invention for use in laptop computers.

FIG. 13 shows an alternate embodiment of the present data input device, generally designated 100. As shown, the device 100 includes left and right members 102, 104, each of which is hingedly connected via a respective hinge edge 106, 108 to a laptop computer 110. Each member 102, 104 includes a respective curved key surface 112, 114 respectively having four finger cavities 102a, 104a formed therein. Also, each member 102, 104 includes a respective thumb control surface 116, 118 that is oriented generally perpendicularly to the associated key surface 112, 114 and that includes one or more thumb controls 102b, 104b. Accordingly, the thumbs and fingers operate in partial apposition, similar to the device 10 shown in FIG. 1 above. A respective convex palm rest 120, 122 rises from each key surface 112, 114 as shown. A pointer key 124 is associated with the right key surface 114, and cursor controls 126 are associated with the right thumb control surface 118 as shown.

Figure 14:
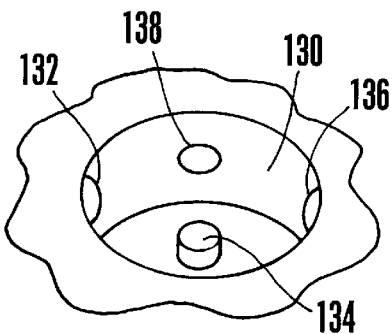
FIG. 14 is a perspective view of an alternate index finger cavity for providing a full 30 key QWERTY layout with a single character set.

Now referring to FIG. 14, an alternate index finger cavity is shown, generally designated 130, for providing a full QWERTY letter layout with a single character set. It is to be understood that the index finger cavity 130 represents one of the left and right index finger cavities of an alternate data input device that is in all other substantial respects identical in construction and operation to the device 10 shown in FIG. 1, with the exceptions noted below. In other words, this alternate device includes three switches in each of the left and right middle, ring, and pinky finger cavities as described previously in relation to FIG. 1, but four switches in each of the left and right index finger cavities as shown in FIG. 14. It is to be understood that while the disclosure below discusses a left index finger cavity, the right index finger cavity is a mirror reverse of the left index finger cavity, but in all other essential respects is identical to the left index finger cavity.

As shown, the alternate index finger cavity 130 includes extension, depression, and contraction switches 132, 134, 136. Each of the extension, depression, and contraction switches 132, 134, 136 can be individually operated to input the letters described previously in relation to the primary character set for the QWERTY layout shown in FIG. 7.

Further, the cavity 130 includes a sidewall switch 138 that positioned on the sidewall that is closest to the front of the cavity 130. The sidewall switch 138 can be struck by a user's index finger simultaneously with the user's finger striking one of the extension, depression, and contraction switches 132, 134, 136.

Figure 15:
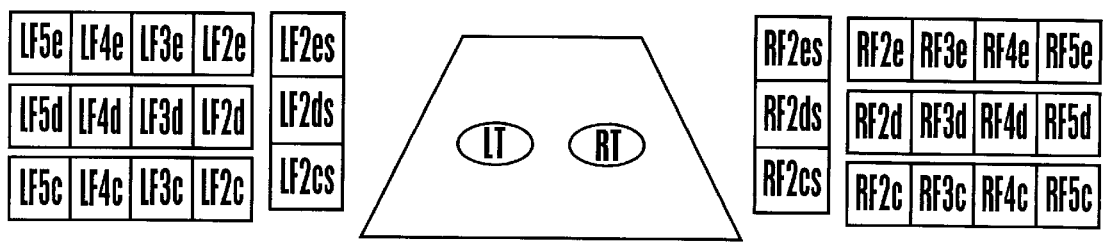
FIG. 15 is a schematic diagram of the hand members and thumb control surface of the alternate QWERTY embodiment using the index finger cavity shown in FIG. 14.
Figure 16:
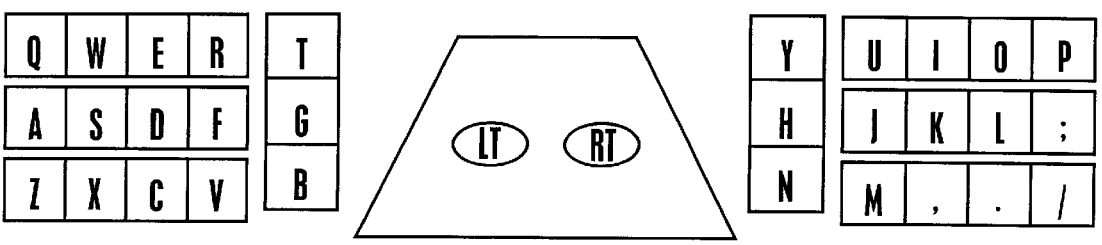
FIG. 16 is a schematic diagram showing the primary set of the QWERTY character layout in the full QWERTY embodiment shown in FIG. 15.

In reference to FIGS. 15 and 16, the striking of the sidewall switch simultaneously with one of the extension, depression, and contraction switches 132, 134, 136 (denoted in FIG. 15 by the LF2es, LF2ds, LF2cs, respectively for the left index finger and RF2es, RF2ds, RF2cs, respectively for the right index finger) signifies the input of the letters "T", "G", and "B" (when the cavity 130 is the left index finger cavity) and "Y", "H", and "N" (when the cavity 130 is the right index finger cavity), as shown in FIG. 16.

Thus, all 26 letters, plus the punctuation symbols representing a semicolon, a period, a comma, and a slash, are established in a single character set in mimic of a conventional 30 key QWERTY layout. The skilled artisan will recognize that with the combination of structure described above, extending the left index finger upward and sideward on a standard QWERTY keyboard renders a "T", and the same motion renders a "T" when using the embodiment shown in FIGS. 14–16. Likewise, inputting other letters using finger motions in the present invention mimic the motions that would be made to type the respective letters on a conventional QWERTY keyboard.

While the particular ERGONOMIC COMPUTER KEYBOARD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. An efficient data entry device having an improved character layout, comprising:
   a first hand member including twelve switches for generating respective first signals, five of which first signals are representative of all the English language vowels; and
   a second hand member including twelve switches for generating respective second signals, wherein each signal by itself represents a consonant, wherein the switches of each member are arranged in three rows of four switches each, with a first row of the first hand member defining the letters "I", "A", "O", and "E", a second row of the first hand member defining the letters "F", "U", "G", and "Y", a third row of the first hand member defining the letters "K" and "V" and two symbols, and wherein first, second, and third rows of the second hand member respectively define the letters "L", "P", "D", "W", "H", "T", "S", "N", and "R", "M", "C", "B".

2. The device of claim 1, wherein the device is configured as a unitary pyramid having an apex and a base, with the hand members being established by respective opposed faces of the housing, each hand member being formed with four finger cavities, each finger cavity including respective first, second, and third switches that respectively generate first, second, and third signals, and the first, second, and third switches being respectively activated by a user's finger moving along three respective axes within the cavity, and wherein the cavities of each hand member are arranged in an arc extending between an apex and the base, with the uppermost cavity establishing an index finger cavity, the next uppermost cavity establishing a middle finger cavity, the next lowermost cavity establishing a ring finger cavity, and the lowermost cavity establishing a pinky cavity for respectively receiving the user's index, middle, ring, and pinky fingers, such that the user's hand is in an ergonomically neutral orientation.

3. The device of claim 2, wherein in at least one of the character sets the depression signals represent letters having a combined frequency of occurrence in English words greater than the combined frequency of occurrence of letters represented by extension and contraction signals.

4. The device of claim 3, further comprising:

a thumb control surface between the hand members; and a microprocessor for receiving the signals from the switches and for generating respective character signals representative of respective keyboard characters in response thereto.

5. The device of claim 4, wherein the thumb control surface includes a plurality of control keys, each key for generating a respective control signal when the user urges against the key, and wherein at least one of the control signals is a set signal representative of one of a plurality of character sets, and the microprocessor generates each character signal in response to the set signal and the respective finger signal.

6. The device of claim 5, further comprising a telephone microphone mounted on the housing, wherein at least one of the control signals causes the thumb control pad to assume the function of a telephone keypad.

7. The device of claim 6, wherein at least one of the control signals causes the thumb control pad to assume the function of a pressure-sensitive cursor control pad.

* * * * *